(12) United States Patent
Zhang et al.

(10) Patent No.: US 12,247,119 B2
(45) Date of Patent: Mar. 11, 2025

(54) EMULSION COMPOSITION, POLYSTYRENE NANO-FIBER, POLYSTYRENE NANO-FIBER PRODUCT, PREPARATION METHOD, AND USE THEREOF

(71) Applicant: JIANGSU GUOWANG HIGH-TECHNIQUE FIBER CO., LTD., Jiangsu (CN)

(72) Inventors: Tao Zhang, Jiangsu (CN); Haoguan Gui, Jiangsu (CN); Guohong Gao, Jiangsu (CN)

(73) Assignee: Jiangsu Guowang High-Technique Fiber Co., Ltd., Jiangsu (CN)

( * ) Notice: Subject to any disclaimer, the term of this patent is extended or adjusted under 35 U.S.C. 154(b) by 564 days.

(21) Appl. No.: 17/289,022

(22) PCT Filed: Jun. 19, 2019

(86) PCT No.: PCT/CN2019/091895
§ 371 (c)(1),
(2) Date: Apr. 27, 2021

(87) PCT Pub. No.: WO2020/252694
PCT Pub. Date: Dec. 24, 2020

(65) Prior Publication Data
US 2022/0098395 A1 Mar. 31, 2022

(51) Int. Cl.
| C08L 25/06 | (2006.01) |
| B01J 20/26 | (2006.01) |
| B01J 20/28 | (2006.01) |
| B01J 20/30 | (2006.01) |
| C08L 25/18 | (2006.01) |
| D01F 6/22 | (2006.01) |

(52) U.S. Cl.
CPC ............. *C08L 25/06* (2013.01); *B01J 20/265* (2013.01); *B01J 20/28023* (2013.01); *B01J 20/2808* (2013.01); *B01J 20/28083* (2013.01); *B01J 20/28085* (2013.01); *B01J 20/3007* (2013.01); *B01J 20/3078* (2013.01); *C08L 25/18* (2013.01); *D01F 6/22* (2013.01)

(58) Field of Classification Search
CPC .......... C08L 25/18; C08L 25/04; C08L 25/06; C08L 25/08; C08F 12/30; C08F 112/30; C08F 212/30; C08F 12/08; C08F 112/08; C08F 212/08; D01F 6/22
See application file for complete search history.

(56) References Cited

FOREIGN PATENT DOCUMENTS

| CN | 1310741 A | 8/2001 |
| CN | 101885813 A | 11/2010 |
| CN | 104593895 A | 5/2015 |
| CN | 106132368 A | 11/2016 |
| CN | 106367845 A | 2/2017 |
| KR | 2010-0105157 A | 9/2010 |
| WO | 2017/214741 A1 | 12/2017 |
| WO | 2018/197485 A1 | 11/2018 |

OTHER PUBLICATIONS

Zhang, T. et al Polymer Chemistry vol. 7 pp. 7469-7476 (Year: 2016).*
Zhang, T. et al Chemical Engineering Journal vol. 307 pp. 812-819 (Year: 2017).*
Written Opinion for International Patent Application No. PCT/CN2019/091895, dated Feb. 13, 2020, in 4 pages.

* cited by examiner

*Primary Examiner* — John M Cooney
*Assistant Examiner* — Jeffrey S Lenihan
(74) *Attorney, Agent, or Firm* — Knobbe, Martens, Olson & Bear, LLP

(57) ABSTRACT

An emulsion composition, a polystyrene nano-fiber, a polystyrene nano-fiber product and a preparation method and use thereof, wherein the emulsion composition comprises a dispersed phase and a continuous phase, the dispersed phase contains a soluble salt and a first solvent, the continuous phase contains polystyrene, a second solvent and sulfonated polystyrene being syndiotactic polystyrene and/or isotatic polystyrene; the preparation of the emulsion composition: under heating and stirring, dropwise adding the dispersed phase into the continuous phase; the preparation of the polystyrene nano-fiber or polystyrene nano-fiber product: crystallize the above emulsion composition; the polystyrene nano-fiber prepared by the above emulsion composition has a pore structure, and the prepared product has a stable and controllable three-dimensional structure and multi-level and/or intercommunicated pore structure, and also has a high preparation efficiency, therefore the above polystyrene nano-fiber or product has excellent application prospects in absorption, adsorption, oil-water separation, and construction of special wettability surfaces.

16 Claims, 5 Drawing Sheets

EMULSION COMPOSITION, POLYSTYRENE NANO-FIBER, POLYSTYRENE NANO-FIBER PRODUCT, PREPARATION METHOD, AND USE THEREOF

CROSS-REFERENCE TO RELATED APPLICATIONS

This application is the U.S. National Phrase under 35 U.S.C § 371 of International Application PCT/CN2019/091895, filed Jun. 19, 2019, the disclosure of which is hereby incorporated by reference in its entirety.

TECHNICAL FIELD

The present disclosure relates to the field of the nano-fiber technology, specifically to an emulsion composition for preparing a polystyrene nano-fiber, a polystyrene nano-fiber, a polystyrene nano-fiber product, and a preparation method and use thereof, the prepared polystyrene nano-fiber has a pore structure, and the prepared polystyrene nano-fiber product has a stable and controllable three-dimensional structure and a multi-level and/or intercommunicated pore structure.

BACKGROUND

Nano-fibers have advantages such as large specific surface and controllable diameter, which make them have important applications in absorption, adsorption, oil-water separation, and construction of special wettability surfaces. In particular, the polystyrene nano-fibers are more and more wildly used in practical applications. At present, electrospinning method is the main preparation methods of polystyrene nano-fibers, such as Chinese Invention Patent CN107675360A disclosing a preparation method of a polystyrene nano-fiber comprising the following steps: dissolving polystyrene in a mixed solvent of dimethyl formamide and p-xylene to give a first solution; dissolving at least one of polyether, polyvinyl alcohol and polyvinyl pyrrolidone in deionized water to give a second solution; separately suctioning the first solution and the second solution into an electrospinning injection syringe with double nozzles, and according to an extrusion rate of the first solution of 0.3-0.6 mL/min and an extrusion rate of the second solution of 1.5-2.5 mL/min, spinning the first solution and the second solution to obtain a fiber membrane formed by interlacing micron-level fibers and nano-level polystyrene fibers; placing the fiber membrane in deionized water for rinsing treatment to remove the micron-level fibers; freeze-drying the rinsing treated fiber membrane. However, this electrospinning method for preparing nano-fibers has the following defects: 1) Low preparation efficiency of polystyrene nano-fibers: based on the characteristics of electrospinning methods, it often takes a long time to prepare a small amount of nano-fibers; 2) External form is difficult to control: products formed by nano-fibers obtained by electrospinning are often presented as two-dimensional fiber membranes, which are difficult to obtain three-dimensional structures, and at the same time, they are easily decomposed or dispersed in inorganic solvents and/or organic solvents, making it more difficult to form stable and controllable three-dimensional structures; 3) The prepared nano-fibers often only have a single cellular structure between each other, which greatly restricts the exchange of material and energy and affects the efficacy of nano-fibers. The existence of the above-mentioned defects greatly limits the large-scale application of polystyrene nano-fibers.

SUMMARY

The technical problem to be solved by the present disclosure is to overcome the defects of the prior art, and provide a novel emulsion composition for preparing a polystyrene nano-fiber, the polystyrene nano-fiber prepared by this emulsion composition has a pore structure, and the prepared polystyrene nano-fiber product has a stable and controllable three-dimensional structure and a multi-level and/or intercommunicated pore structure, and also has a high preparation efficiency.

The present disclosure also provides a preparation method of the above emulsion composition for preparing polystyrene nano-fibers.

The present disclosure also provides a polystyrene nano-fiber or a polystyrene nano-fiber product.

The present disclosure also provides a preparation method of the above polystyrene nano-fiber product, which has a high preparation efficiency, and the prepared three-dimensional morphological product is capable of existing stably in an inorganic solvent and/or organic solvent, is controllable in three-dimensional form, and also has a multi-level and/or intercommunicated pore structure.

The present disclosure also provides use of the above-mentioned polystyrene nano-fiber product or polystyrene nano-fiber in absorption, adsorption, oil-water separation, and construction of special wettability surfaces.

To solve the above technical problems, a technical solution employed by the present disclosure is as follows:

an emulsion composition for preparing polystyrene nano-fiber, comprising a dispersed phase and a continuous phase, wherein the dispersed phase contains a soluble salt and a first solvent, the continuous phase contains polystyrene, a second solvent and sulfonated polystyrene, and the polystyrene is selected from syndiotactic polystyrene, isotatic polystyrene, and combinations thereof.

According to some preferred and specific aspects of the present disclosure, the emulsion composition is prepared by mixing the dispersed phase and the continuous phase, wherein a feeding volume of the dispersed phase is greater than a feeding volume of the continuous phase.

In an embodiment, the emulsion composition is prepared by mixing the dispersed phase and the continuous phase, wherein the feeding volume of the dispersed phase is greater than or equal to 1.5 times the feeding volume of the continuous phase. According to some preferred aspects of the present disclosure, the emulsion composition is prepared by dropwise adding the dispersed phase into the continuous phase.

In an embodiment, the emulsion composition is prepared by mixing the dispersed phase and the continuous phase, wherein the dispersed phase and the continuous phase are mixed at 100-140° C., preferably 105-130° C.

In an embodiment, the first solvent is insoluble, slightly soluble, or differently soluble in the second solvent.

In an embodiment, the first solvent is a polar solvent, and the second solvent is a non-polar solvent.

In an embodiment, the first solvent is selected from water, glycerol, propylene glycol, ethylene glycol and combinations thereof, and the second solvent is 1,2,4-trichlorobenzene.

In an embodiment, a feeding mass ratio of the soluble salt to the first solvent is 0.004-0.080:1, preferably 0.006-0.070:1.

In an embodiment, the soluble salt is selected from sodium chloride, potassium chloride, barium chloride, calcium chloride, sodium carbonate, sodium bicarbonate, sodium sulfate, potassium sulfate, sodium nitrate, potassium nitrate, calcium nitrate and combinations thereof.

In an embodiment, a sulfonation degree of the sulfonated polystyrene is 0.5-3.5 mol %, more preferably 1-2.5 mol %, and compared with other emulsifiers, the sulfonated polystyrene in the system of the present disclosure may realize to maintain the emulsion composition in a stable emulsification state for a long time, and the above specific sulfonated polystyrene can ensure the respective components maintain an excellent emulsification state after being mixed.

In an embodiment, a feeding mass ratio of the sulfonated polystyrene, the polystyrene and the second solvent is 0.005-0.025:0.03-0.08:1.

In an embodiment, in percent by mass, in the emulsion composition, the soluble salt accounts for 0.1-6%, the first solvent accounts for 60-85%, the polystyrene accounts for 0.5-10%, the second solvent accounts for 14-30%, and the sulfonated polystyrene accounts for 0.05-3%.

In an embodiment, average molecular weight of the polystyrene is 10,000-2,000,000, preferably 50,000-500,000.

In an embodiment, the emulsion composition comprises a dispersed phase and a continuous phase, the dispersed phase contains a soluble salt and a first solvent, the continuous phase contains polystyrene, a second solvent and sulfonated polystyrene, and the polystyrene is selected from syndiotactic polystyrene, isotatic polystyrene, and combinations thereof, the dispersed phase is dropwise added into the continuous phase at the temperature of 100-140° C. under stirring to form the emulsion composition, wherein a feeding volume of the dispersed phase is greater than or equal to 1.5 times the feeding volume of the continuous phase, the first solvent is selected from water, glycerol, propylene glycol, ethylene glycol and combinations thereof, the second solvent is 1,2,4-trichlorobenzene, a feeding mass ratio of the soluble salt to the first solvent is 0.004-0.080:1, the soluble salt is selected from sodium chloride, potassium chloride, barium chloride, calcium chloride, sodium carbonate, sodium bicarbonate, sodium sulfate, potassium sulfate, sodium nitrate, potassium nitrate, calcium nitrate and combinations thereof, a sulfonation degree of the sulfonated polystyrene is 0.5-3.5 mol %, a feeding mass ratio of the sulfonated polystyrene, the polystyrene and the second solvent is 0.005-0.025:0.03-0.08:1, and in percent by mass, in the emulsion composition, the soluble salt accounts for 0.1-6%, the first solvent accounts for 60-85%, the polystyrene accounts for 0.5-10%, the second solvent accounts for 14-30%, and the sulfonated polystyrene accounts for 0.05-3%, and the average molecular weight of the polystyrene is 10,000-2,000,000.

Another technical solution provided by the present disclosure is, a preparation method of the above emulsion composition for preparing polystyrene nano-fibers, which comprises the following step: under heating and stirring, dropwise adding the dispersed phase into the continuous phase to prepare the emulsion composition. Still another technical solution provided by the present disclosure is, a polystyrene nano-fiber or a polystyrene nano-fiber product prepared by the above emulsion composition for preparing polystyrene nano-fibers.

According to the present disclosure, the product has a multi-level and/or intercommunicated pore structure.

In an embodiment, the multi-level pore structure comprises a first pore, a second pore, and a third pore;
wherein, the first pore has a pore diameter of 0.1-5 nm, preferably 0.2-4 nm, and more preferably 0.3-2 nm;
the second pore has a pore diameter of 6-800 nm, preferably 10-600 nm, and more preferably 15-300 nm;
the third pore has a pore diameter of 0.1-200 μm, preferably 0.5-100 μm, more preferably 0.5-50 μm, and further preferably 0.5-20 μm.

In an embodiment, the second pore has a pore diameter greater than that of the first pore and smaller than that of the third pore.

Yet another technical solution provided by the present disclosure is, a preparation method of the above-mentioned polystyrene nano-fiber product, which comprises the following step: adding the above emulsion composition for preparing polystyrene nano-fibers into a mold to crystallize.

In an embodiment, the preparation method further comprises, under heating and stirring, dropwise adding the dispersed phase into the continuous phase to prepare the emulsion composition for preparing polystyrene nano-fibers; and then adding the obtained emulsion composition into a mold within a setting time, standing and crystallizing, separating, washing, freeze-drying to give the polystyrene nano-fiber product.

In an embodiment, the setting time is greater than 0 and smaller than or equal to 10 min, preferably greater than 0 and smaller than or equal to 5 min.

In an embodiment, the crystallization time is greater than 1 h, preferably greater than 3 h, more preferably greater than 5 h.

In an embodiment, the crystallization temperature is 5-90° C., preferably 10-80° C., more preferably 15-45° C.

Still yet another technical solution provided by the present disclosure is: use of the above-mentioned polystyrene nano-fiber product or polystyrene nano-fiber in absorption, adsorption, oil-water separation, and construction of special wettability surfaces.

Due to the use of the above technical solutions, the present disclosure has the following advantages over the conventional art:
the present disclosure creatively presents an emulsion composition, and the specific emulsion composition is used to prepare polystyrene nano-fibers or polystyrene nano-fiber products, which not only has high preparation efficiency (compared with the electrospinning method, which can only produce a small amount of nano-fibers within a certain period of time due to being limited by the electrospinning principle and the electrospinning equipment designed according to the electrospinning principle, it can prepared according to the present disclosure by adding any required amount as needed), and the prepared polystyrene nano-fiber have a pore structure, and at the same time, the specific emulsion composition of the present disclosure can be directly formed into a controllable and stable three-dimensional polystyrene nano-fiber product in the solvent that is not easy to disperse/decompose during the crystallization process via an additional mold, and also cause the prepared polystyrene nano-fiber product can both have the pore structure of the polystyrene nano-fiber itself, the pore structure formed between the fibers, and the large pore structure formed between the fiber clusters due to uneven stress during the crystallization process in the solvent, therefore, a product with a multi-level pore structure is obtained, and the pore structures can also communicate with each other, which significantly improves the exchange of material and energy, and the specific surface area is large enough to cause the polystyrene nano-fiber and the polystyrene nano-fiber product provided by the present disclosure has excellent application prospects in terms of absorption, adsorption, oil-water separation, and construction of special wettability surfaces.

DETAILED DESCRIPTION OF EXEMPLARY EMBODIMENTS

In the following, the present disclosure is further explained in detail combining with specific embodiments; it should be understood that these embodiments are used for explaining the basic principle, major characteristic and advantages of the present disclosure, and the present disclosure is not limited to the scope of the following embodiments; the implementation conditions adopted in the embodiments can be further adjusted according to different requirements of specific use, and the unspecified implementation conditions are generally the conditions in normal experiment. In the following description, all raw material are commercially purchased or prepared according to conventional methods in the art, unless particularly stated.

In the following, the sulfonation degree of the sulfonated polystyrene is 1.8 mol %; syndiotactic polystyrene and isotatic polystyrene were purchased from Idemitsu Kosan Co., Ltd., Japan, with a molecular weight of approximately 300,000.

Embodiments 1-3

The present Embodiments 1-3 provide a preparation method of a polystyrene nano-fiber product and the prepared polystyrene nano-fiber product, wherein the method specifically comprises the following steps:
- (a) at 120±5° C. and under stirring (rotate speed: 400 rpm), a dispersed phase was dropwise added into a continuous phase to prepare a homogeneous emulsion composition; wherein the dispersed phase was prepared by dispersing sodium chloride in glycerol and mixing, and the continuous phase was prepared by adding sulfonated polystyrene and syndiotactic polystyrene into 1,2,4-trichlorobenzene and mixing;
- (b) the emulsion composition prepared in Step (a) was directly added into a mold, and stood and crystallized for 10 h at room temperature, and the crystal substance was taken out, replaced by ethanol and water successively for three times, and freeze-dried to prepare the polystyrene nano-fiber product.

See Table 1 below for the raw materials used in the above embodiments and amounts thereof.

TABLE 1

|  | Embodiment 1 | Embodiment 2 | Embodiment 3 |
| --- | --- | --- | --- |
| Continuous phase (mass percent, %) | | | |
| 1,2,4-trichlorobenzene | 22.12 | 22.05 | 21.98 |
| Syndiotactic polystyrene | 0.91 | 1.21 | 1.51 |
| Sulfonated polystyrene | 0.30 | 0.30 | 0.30 |
| Total amount | 23.33 | 23.57 | 23.80 |
| Dispersed phase (mass percent, %) | | | |
| Glycerol | 76.06 | 75.83 | 75.6 |
| Sodium chloride | 0.61 | 0.61 | 0.60 |
| Total amount | 76.67 | 76.43 | 76.20 |
| Volume percent of the dispersed phase in the emulsion composition (%) | 80 | 80 | 80 |

The polystyrene nano-fiber products prepared by Embodiments 1-3 corresponds to Sample 1, Sample 2 and Sample 3, respectively.

Figure 1:
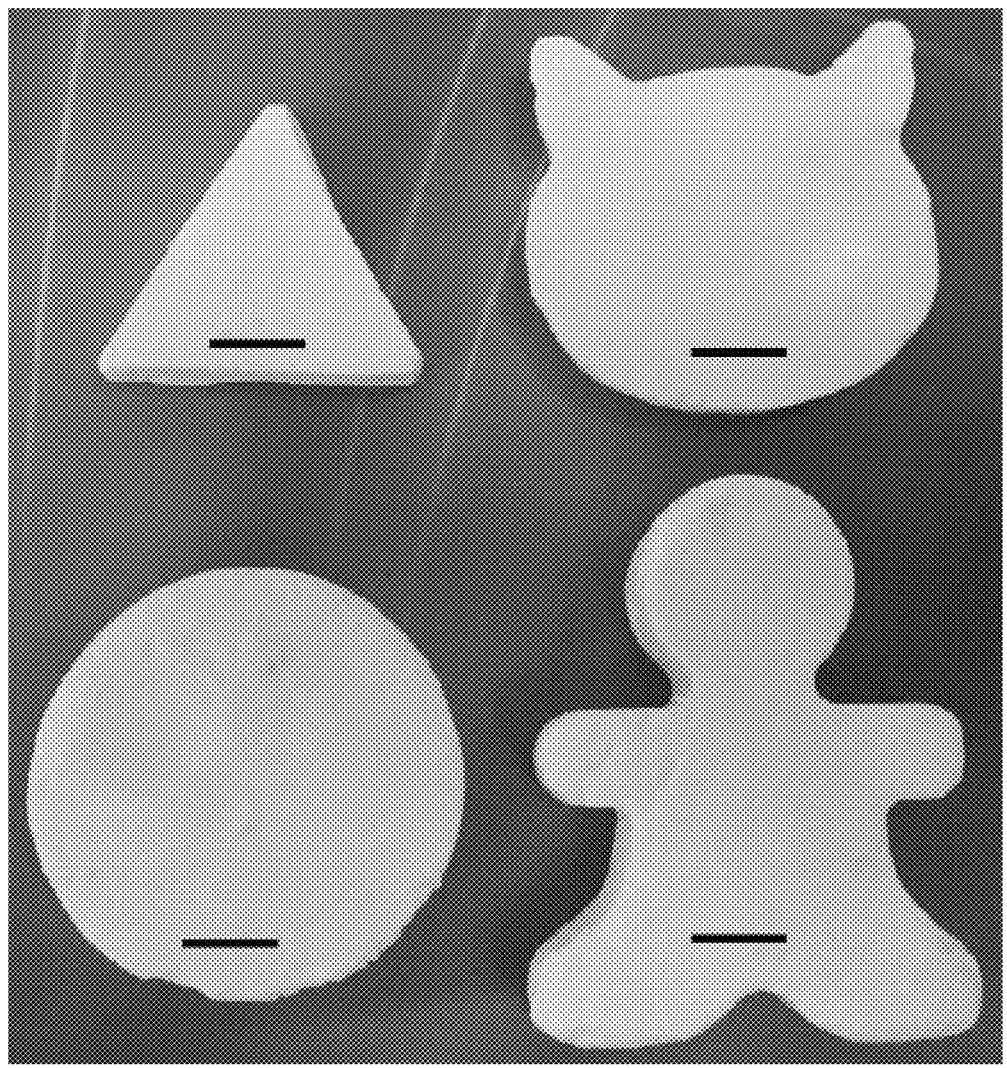
FIG. 1 shows four exemplary three-dimensional structures of a polystyrene nano-fiber product prepared by Embodiment 1 of the present disclosure.
Figure 2:
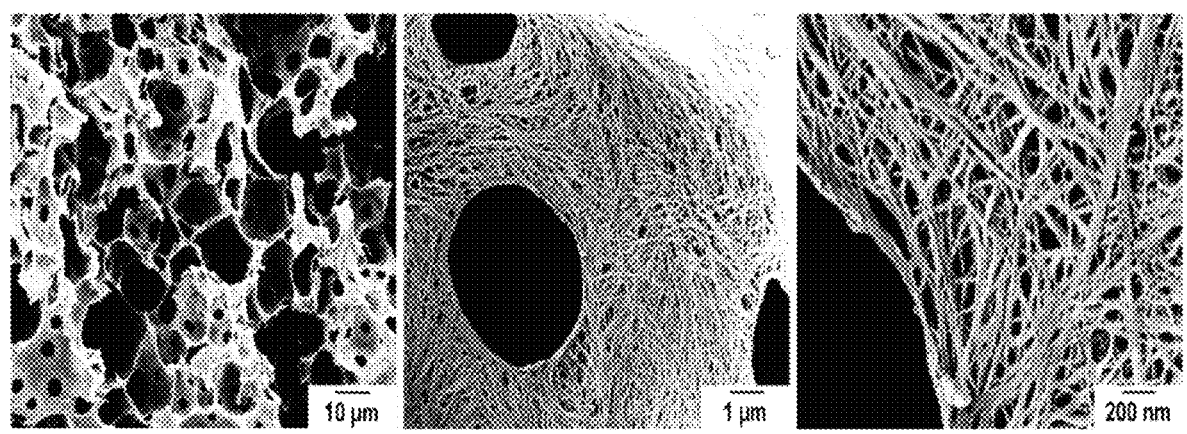
FIG. 2 shows scanning electron micrographs of the polystyrene nano-fiber product prepared by Embodiment 1 of the present disclosure, corresponding to different magnification times from left to right, respectively.

Wherein, FIG. 1 shows four exemplary three-dimensional morphological structures of the polystyrene nano-fiber product prepared by Embodiment 1. FIG. 1 shows that the polystyrene nano-fiber product prepared by the present disclosure can form the required stable and controllable macroscopic three-dimensional structure;

FIG. 2 shows scanning electron micrographs of the polystyrene nano-fiber product prepared by Embodiment 1, corresponding to different magnification times from left to right, respectively. It can be seen from the left graph with lower magnification that the polystyrene nano-fiber product has a plurality of pores due to the present of solvents, and from the middle graph that pores formed between the fiber clusters due to uneven stress during the crystallization process in the solvent, and from the right graph that pore structure formed between the fibers.

Figure 3:
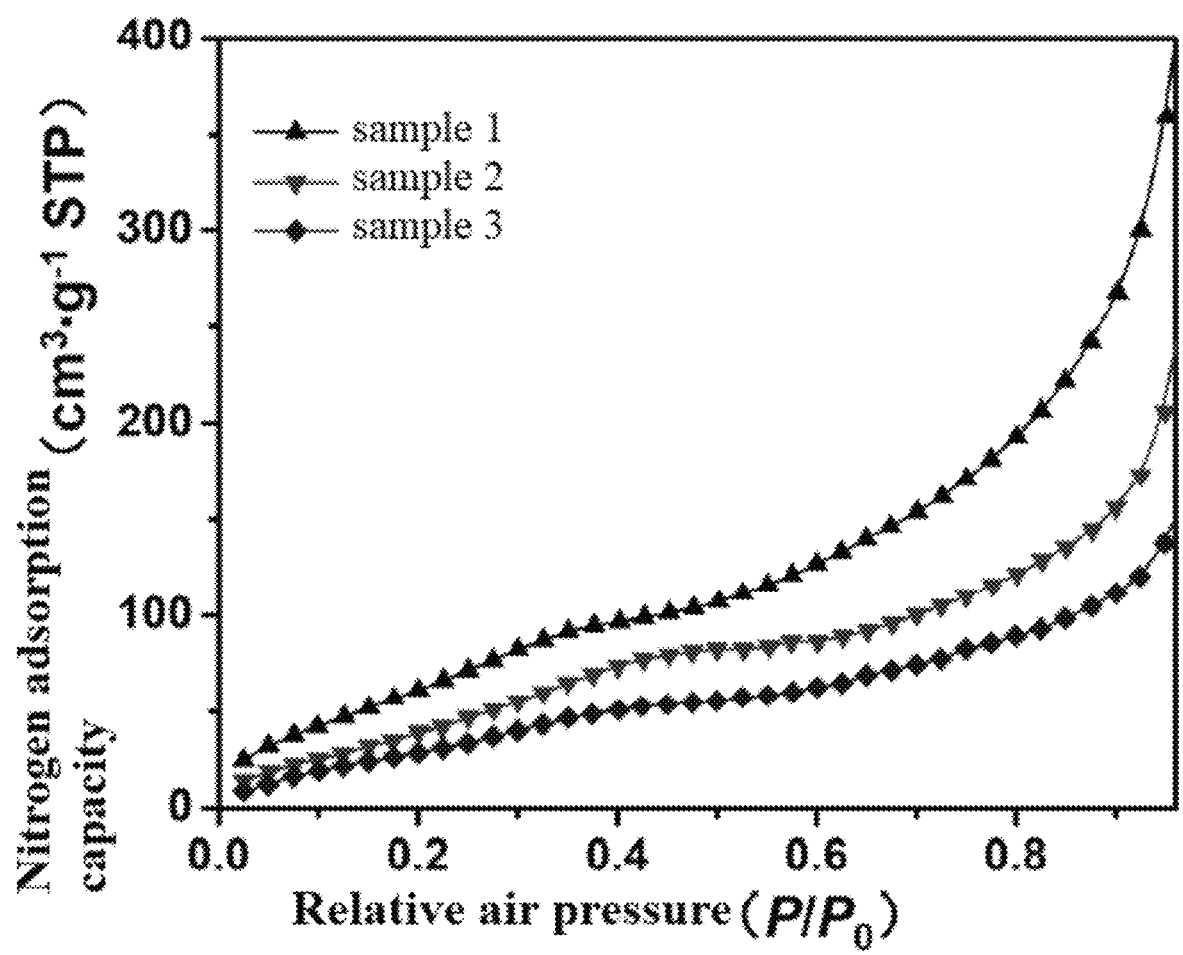
FIG. 3 shows a nitrogen adsorption performance chart of polystyrene nano-fiber products prepared by Embodiments 1-3 of the present disclosure.
Figure 4:
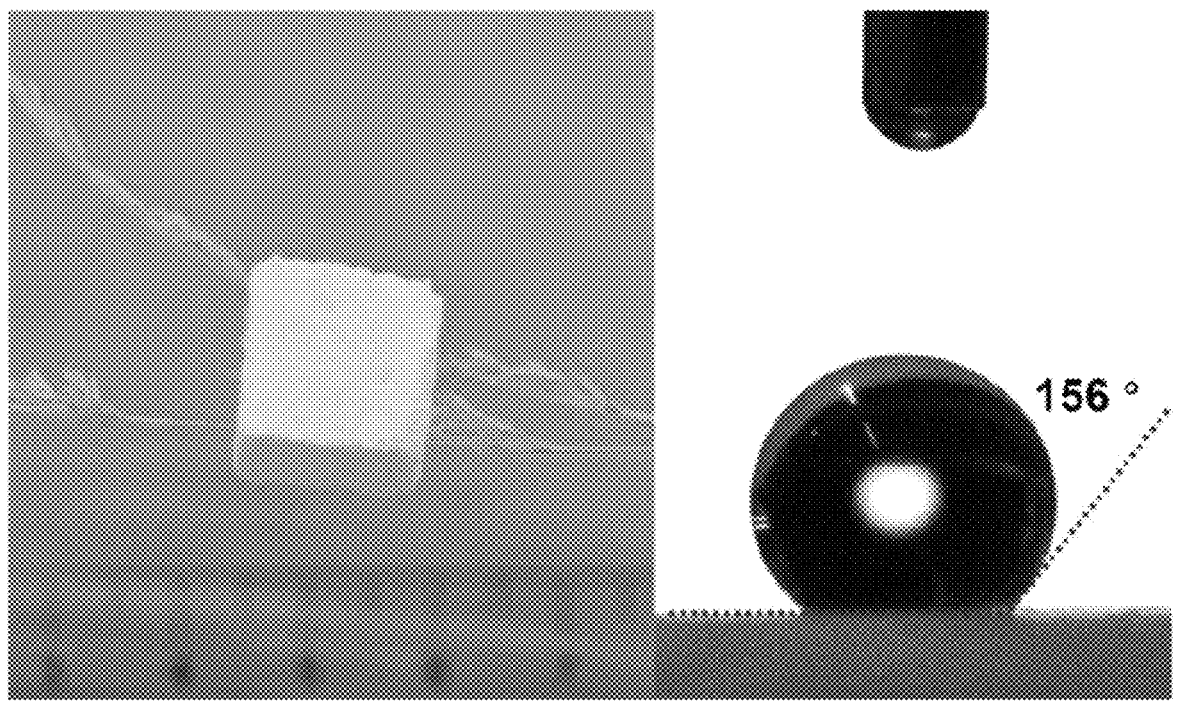
FIG. 4 shows a density detection and hydrophobicity detection chart of the polystyrene nano-fiber product prepared by Embodiment 1 of the present disclosure.

FIG. 3 shows a nitrogen adsorption performance chart of polystyrene nano-fiber products prepared by Embodiments 1-3. It can be analyzed from the FIG. 3 that the polystyrene nano-fiber product prepared by the method of the present disclosure has a high specific surface area, and it also proves that the polystyrene nano-fiber has a microporous structure, and the pore size of the microporous structure is substantially below 2 nm;

FIG. 4 shows a density detection and hydrophobicity detection chart of the polystyrene nano-fiber product prepared by Embodiment 1. It can be seen from the FIG. 4 that its density is very low, the overall appearance is ultra-light quality, and the hydrophobic performance is super-hydrophobic level, up to 156°.

Embodiments 4-6

The present Embodiments 4-6 provide a preparation method of a polystyrene nano-fiber product and the prepared polystyrene nano-fiber product, wherein the method specifically comprises the following steps:
(a) at 120±5° C. and under stirring (rotate speed: 400 rpm), a dispersed phase was dropwise added into a continuous phase to prepare a homogeneous emulsion composition; wherein the dispersed phase was prepared by dispersing sodium sulfate in ethylene glycol and mixing, and the continuous phase was prepared by adding sulfonated polystyrene and isotatic polystyrene into 1,2,4-trichlorobenzene and mixing;
(b) the emulsion composition prepared in Step (a) was directly added into a mold, and stood and crystallized for 10 h at room temperature, and the crystal substance was taken out, replaced by ethanol and water successively for three times, and freeze-dried to prepare the polystyrene nano-fiber product.

See Table 2 below for the raw materials used in the above embodiments and amounts thereof.

TABLE 2

| | Embodiment 4 | Embodiment 5 | Embodiment 6 |
|---|---|---|---|
| Continuous phase (mass percent, %) | | | |
| 1,2,4-trichlorobenzene | 22.12 | 22.05 | 21.98 |
| Isotactic polystyrene | 0.91 | 1.21 | 1.51 |
| Sulfonated polystyrene | 0.30 | 0.30 | 0.30 |
| Total amount | 23.33 | 23.57 | 23.80 |
| Dispersed phase (mass percent, %) | | | |
| Ethylene glycol | 72.06 | 71.82 | 71.55 |
| Sodium sulfate | 4.61 | 4.62 | 4.65 |
| Total amount | 76.67 | 76.44 | 76.20 |
| Volume percent of the dispersed phase in the emulsion composition (%) | 75 | 75 | 75 |

Application Embodiment 1

Adsorption of Toxic and Volatile Gases

Figure 5:
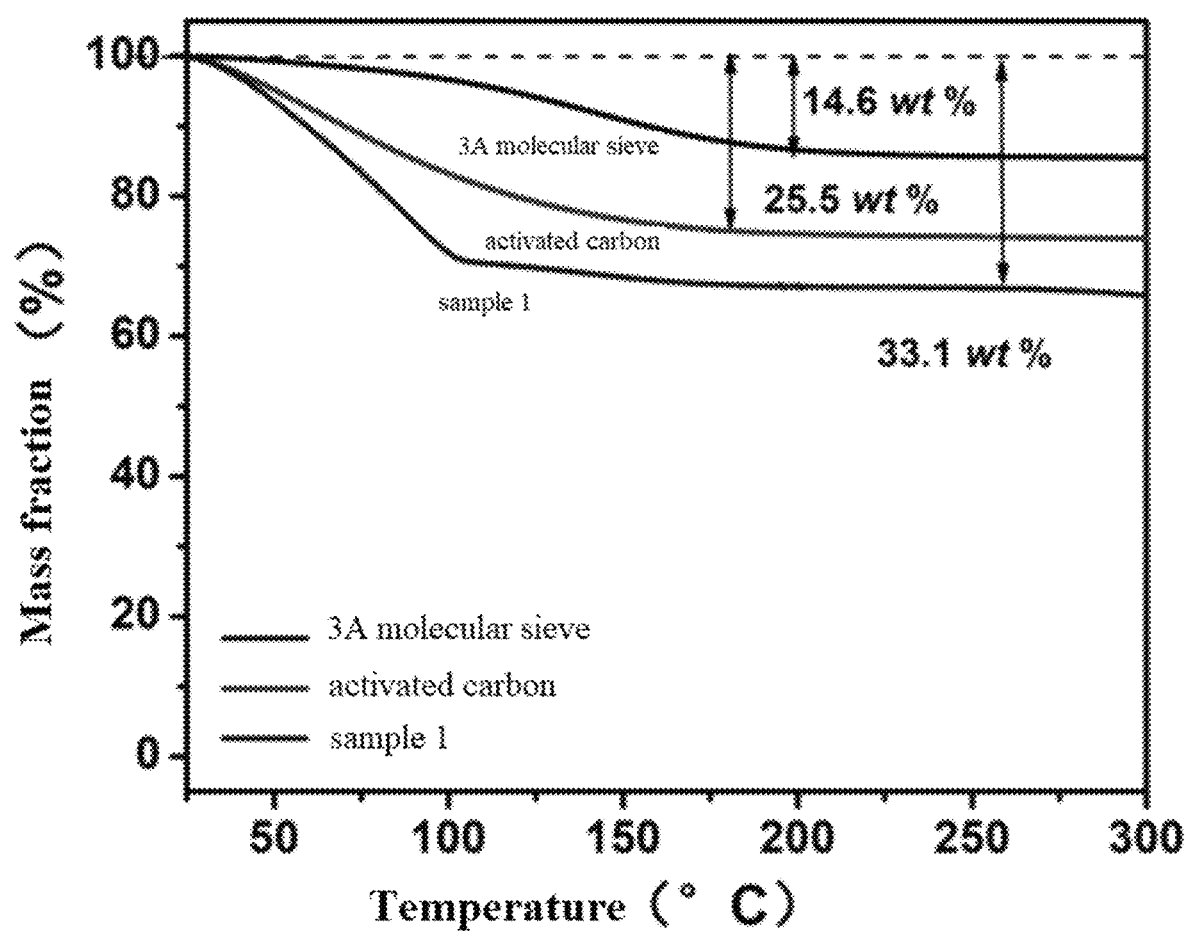
FIG. 5 shows a purification performance chart of the polystyrene nano-fiber product prepared by Embodiment 1 of the present disclosure, 3A molecular sieve and activated carbon on polluted air contained 16 ppm dichloroethane.

The purification ability of Sample 1 prepared in Embodiment 1, 3A molecular sieve and activated carbon with the same quality on polluted air containing 16 ppm dichloroethane was compared, and the adsorption capacity was analyzed by thermogravimetric analysis, and it was found that the adsorption capacity of Sample 1 was higher than molecular sieve and activated carbon respectively, and can substantially achieve desorption at a lower temperature, which is beneficial to save energy, see FIG. 5 for details, which shows the multi-level pore structure and large specific surface area of the polystyrene nano-fiber products of the present disclosure greatly improve the adsorption capacity and desorption rate.

Application Embodiment 2

Absorption of Organic Liquid

Figure 6:
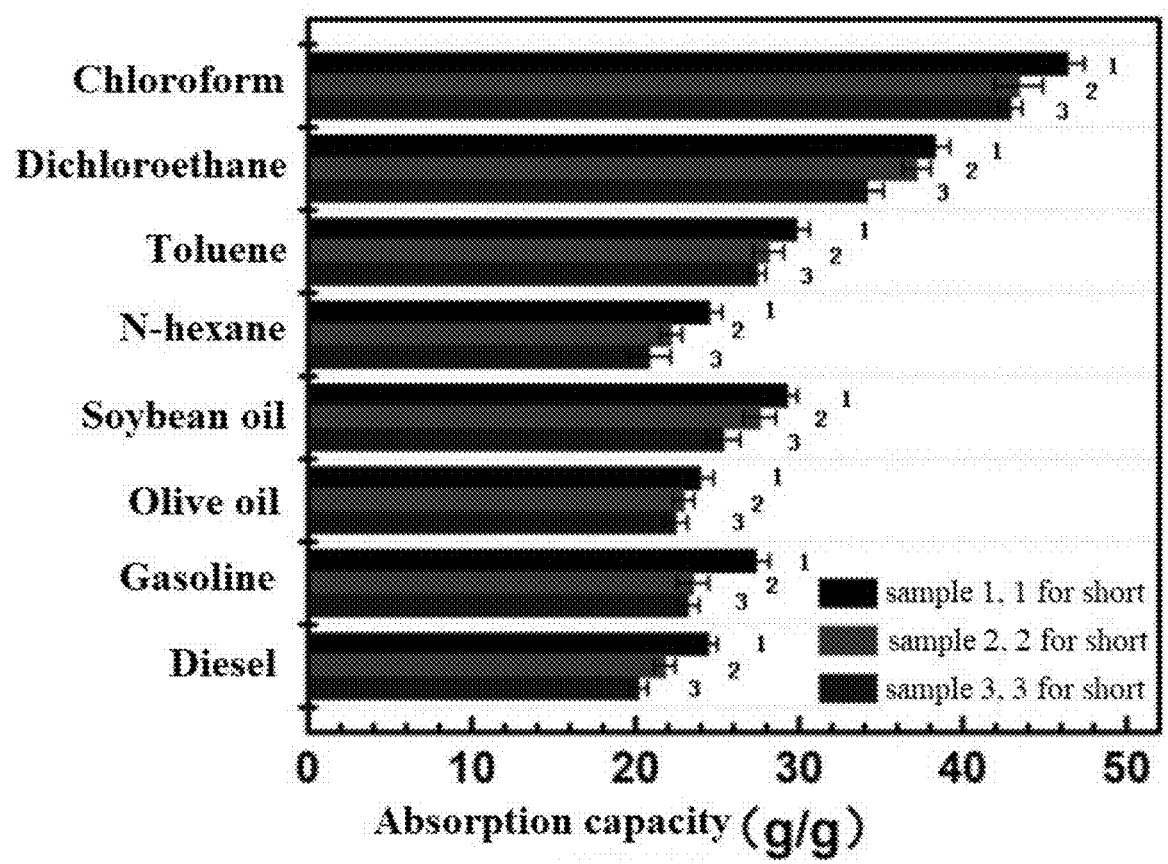
FIG. 6 shows an absorption performance chart of polystyrene nano-fiber products prepared by Embodiments 1-3 of the present disclosure on organic solvents.

The polystyrene nano-fiber products corresponding to Samples 1-3 prepared in Embodiments 1-3 were immersed in different organic solvents and oils, and the oil absorption of the samples was obtained by weighing, and it was found that the oil absorption of some organic solvents of the polystyrene nano-fiber products can reach 50 times their own weight, see FIG. 6 for details, which shows that the polystyrene nano-fiber products of the present disclosure have a higher absorption capacity for a variety of organic solvents.

Application Embodiment 3

Oil-Water Separation

From the foregoing, it can be seen that the polystyrene nano-fibers and their polystyrene nanofiber products of the present disclosure have super-hydrophobicity and lipophilicity, which can allow oily liquids to pass through well, while blocking the passage of water, such that they can be used for oil-water separation.

Application Embodiment 4

Gas Filtration

It can be seen from the foregoing that the internal structure of the polystyrene nano-fiber product of the present disclosure is multi-level and intercommunicated, which can greatly accelerate the transmission of substances. At the same time, the spacing and pores between the fibers are only nano-level, which can well trap larger-sized solid particles, so it can be used for PM2.5 and PM10 filtration.

The embodiments described above are only for illustrating the technical concepts and features of the present disclosure, and are intended to make those skilled in the art being able to understand the present disclosure and thereby implement it, and should not be concluded to limit the protective scope of this disclosure.

What is claimed is:

1. An emulsion composition for preparing polystyrene nano-fibers, comprising a dispersed phase and a continuous phase, the dispersed phase contains a soluble salt and a first solvent, the continuous phase contains polystyrene, a second solvent, and sulfonated polystyrene, and the polystyrene is selected from syndiotactic polystyrene, isotatic polystyrene, and combinations thereof.

2. The emulsion composition for preparing polystyrene nano-fibers according to claim 1, wherein the emulsion composition is prepared by mixing the dispersed phase and the continuous phase, wherein a feeding volume of the dispersed phase is greater than a feeding volume of the continuous phase.

3. The emulsion composition for preparing polystyrene nano-fibers according to claim 2, wherein the emulsion composition is prepared by mixing the dispersed phase and the continuous phase, wherein the feeding volume of the dispersed phase is greater than or equal to 1.5 times the feeding volume of the continuous phase.

4. The emulsion composition for preparing polystyrene nano-fibers according to claim 2, wherein the dispersed phase and the continuous phase are mixed at 100-140° C.

5. The emulsion composition for preparing polystyrene nano-fibers according to claim 1, wherein the first solvent is a polar solvent, and the second solvent is a non-polar solvent.

6. The emulsion composition for preparing polystyrene nano-fibers according to claim 5, wherein the first solvent is selected from water, glycerol, propylene glycol, ethylene glycol, and combinations thereof, and the second solvent is 1,2,4-trichlorobenzene.

7. The emulsion composition for preparing polystyrene nano-fibers according to claim 1, wherein a feeding mass ratio of the soluble salt to the first solvent is 0.004-0.080:1.

8. The emulsion composition for preparing polystyrene nano-fibers according to claim 1, wherein the soluble salt is selected from sodium chloride, potassium chloride, barium chloride, calcium chloride, sodium carbonate, sodium bicarbonate, sodium sulfate, potassium sulfate, sodium nitrate, potassium nitrate, calcium nitrate, and combinations thereof.

9. The emulsion composition for preparing polystyrene nano-fibers according to claim 1, wherein a sulfonation degree of the sulfonated polystyrene is 0.5-3.5 mol %.

10. The emulsion composition for preparing polystyrene nano-fibers according to claim 1, wherein a feeding mass ratio of the sulfonated polystyrene, the polystyrene and the second solvent is 0.005-0.025:0.03-0.08:1.

11. The emulsion composition for preparing polystyrene nano-fibers according to claim 1, wherein in percent by mass, in the emulsion composition, the soluble salt accounts for 0.1-6%, the first solvent accounts for 60-85%, the polystyrene accounts for 0.5-10%, the second solvent accounts for 14-30%, and the sulfonated polystyrene accounts for 0.05-3%.

12. A preparation method of a polystyrene nano-fiber product, comprising the following step: adding the emulsion composition for preparing polystyrene nano-fibers according to claim 1 into a mold to crystallize.

13. The preparation method of the polystyrene nano-fiber product according to claim 12, wherein the preparation method further comprises:
    under heating and stirring, dropwise adding the dispersed phase into the continuous phase to prepare the emulsion composition for preparing polystyrene nano-fibers; and
    then adding the obtained emulsion composition into a mold within a setting time, standing and crystallizing, separating, washing, and freeze-drying to give the polystyrene nano-fiber product.

14. The preparation method of the polystyrene nano-fiber product according to claim 13, wherein the setting time is greater than 0 and smaller than or equal to 10 min.

15. The preparation method of the polystyrene nano-fiber product according to claim 12, wherein a crystallization time is greater than 1 h, and a crystallization temperature is 5-90° C.

16. The preparation method of the polystyrene nano-fiber product according to claim 12, wherein the product has a multi-level structure, the multi-level structure comprises a first pore, a second pore, and a third pore,
    wherein the first pore has a pore diameter of 0.1-5 nm, the second pore has a pore diameter of 6-800 nm, and the third pore has a pore diameter of 0.1-200 µm.

* * * * *